G. J. RECORD.

FASTENING FOR THE CAPS OF CANS.

No. 11,382. Reissued Nov. 7, 1893.

Witnesses

Geo. Clearance

Parks R. McBride.

Inventor

Geo. J. Record by

Wm. H. Babcock

Attorney

UNITED STATES PATENT OFFICE.

GEORGE J. RECORD, OF CONNEAUT, OHIO.

FASTENING FOR THE CAPS OF CANS.

SPECIFICATION forming part of Reissued Letters Patent No. 11,382, dated November 7, 1893.

Original No. 476,309, dated June 7, 1892. Application for reissue filed August 10, 1893. Serial No. 482,868.

*To all whom it may concern:*

Be it known that I, GEORGE J. RECORD, a citizen of the United States, residing at Conneaut, in the county of Ashtabula and State of Ohio, have invented certain new and useful Improvements in Fastenings for the Caps of Cans, &c.; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention has general reference to improvements in fastenings for closures of vessels, especially the caps of nozzles of cans, fruit-jars, and similar objects; and it consists chiefly in a thin sealing cap provided with projections which snap by resiliency into engagement with the nozzle of the can or the material surrounding the opening, so as to lock the said cap permanently in place, without soldering or burring, the said cap presenting a thin flat disk to close the opening, the said disk being adapted to be easily cut through, all substantially as hereinafter set forth.

Figure 1:
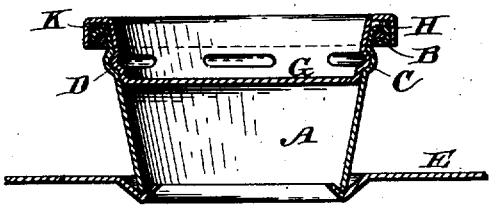
Figure 2:
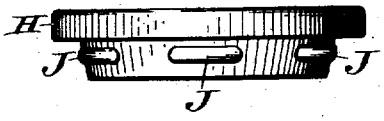
Figure 3:
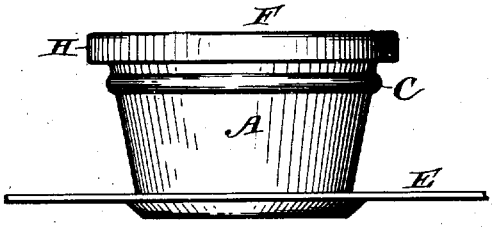
Figure 4:
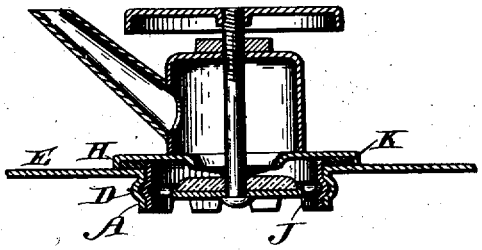

In the drawings already mentioned, which serve to illustrate my said invention more fully, Figure 1 is a sectional elevation of a can-nozzle provided with my removable sealing-cap. Fig. 2 is a side elevation of the cap removed. Fig. 3 is a similar view of the nozzle and cap complete. Fig. 4 is a transverse sectional elevation of a spouted closure secured to the top of the vessel by my improved fastening.

Like parts are designated by corresponding letters of reference in all the figures.

In the body A of the nozzle and in close proximity of the upper curled (imitation wired) edge B of the nozzle I produce an outwardly-projecting bead C, forming in the interior of the nozzle a groove D, said body being soldered or otherwise secured to the top or body E of a varnish, sirup, oil, or other can in the usual manner.

The cap or seal F consists of a thin plate of metal shaped to fit the interior of the said nozzle, and presenting, when in place, a disk-shaped diaphragm G across the opening thereof. This seal or cap also may have its upper peripheral part H bent as shown, to fit over the edge of the nozzle. The said seal has a peripheral series of outwardly pointing projections J, formed in its side wall between the said upper peripheral part H and diaphragm C, and so located in relation to the groove D that when a washer K is placed into the space between the body and rim of the cap and the cap pushed into the nozzle said projections will engage by resiliency the groove D, and thereby lock the cap tightly into the nozzle, it being understood that the body of the cap fits the interior of the nozzle, (a close fit,) so that some force is required to push the cap into the nozzle, which cap will snap, as it were, into position, by its resiliency, and thereby hermetically seal the nozzle. It will thus be seen that but a slight effort is required to seal the nozzle with the cap and that no instrument of any kind is needed to accomplish the object of closing the same. The cap or seal thus locked in place presents a thin flat disk of sheet metal, closing the opening, as shown in Fig. 1. This obviously may easily be cut through when access to the liquid or the outflow of the same is desired.

In some cases where a spouted faucet is used on cans and where the empty can is shipped with the faucet detached I produce in the top of the can an upwardly (or downwardly) pointing rim A, as shown in Fig. 4, and provide this rim with a groove D, the same as the nozzle heretofore described. I then form on the faucet a rim having projections J, analogous to those on the cap F and engaging the groove in precisely the same manner as those of said cap engage the nozzle, so that when it is desired to attach the faucet to the can it needs to be pushed into the rim only to firmly lock it in position. This construction is an equivalent of the one described and clearly within the scope of my invention. As a reversal of the order of things, I may mention the placing of the groove into the cap and the projections into the nozzle, though this construction will interfere with the sealing of the nozzle with the usual cork-stopper in addition to the sealing-cap, and for this reason I do not recommend the same.

It is obvious that this device for securing the cap is applicable to nearly all covered vessels—such as fruit-jars, butter-tubs, lard-pails, &c.—without change or modification.

Having thus fully described my invention, I claim as new and desire to secure by Letters Patent—

1. A seal for closing vessels or receptacles consisting of thin metal provided with laterally projecting parts and a part adapted to extend across the opening of a vessel or nozzle, the latter part being easily cut through and the said seal locking permanently by resiliency, substantially as set forth.

2. In combination with a receptacle having an opening and a groove surrounding the same, a seal provided with projections for interlocking by resiliency with the said groove that part of the seal which closes the said opening being easily cut through, substantially as set forth.

3. A receptacle having an internally grooved nozzle in combination with a thin metallic seal or cap having lateral projections for snapping into the said groove and thereby permanently locking the said seal substantially as set forth.

4. In combination with a receptacle, a seal for closing the opening thereof, the said receptacle having a grooved or unequal inner face for the material surrounding the said opening and the said seal being provided with projections for snapping into engagement therewith, one of the two interlocking parts being resilient and the said seal being of thin material easily cut through substantially as and for the purpose set forth.

5. A seal for closing vessels and receptacles, consisting of thin material easily cut through and having a raised side wall with projecting parts J formed thereon, which are adapted to interlock permanently by resiliency with the grooved inner face of the neck or inlet of the receptacle substantially as set forth.

6. A seal for closing vessels or receptacles constructed with a side wall having lateral projections J a flange H bent to fit over the neck of the receptacle and a thin part or diaphragm G adapted to be easily cut through and the said projections being adapted to engage permanently by resiliency with the grooved inner face of the neck nozzle or inlet of the receptacle substantially as set forth.

In testimony whereof I affix my signature in presence of two witnesses.

GEO. J. RECORD.

Witnesses:
R. M. STEVENSON,
W. T. FINDLEY.